(12) United States Patent
Fletcher et al.

(10) Patent No.: US 8,875,512 B2
(45) Date of Patent: Nov. 4, 2014

(54) DISTRIBUTION PIPELINE POWER PLANT (75) Inventors: Paul Fletcher, Rugby (GB); Philip P. Walsh, Solihull (GB); Aaron J. Stevens, Derby (GB)

(73) Assignee: Rolls-Royce PLC, London (GB)

( * ) Notice: Subject to any disclaimer, the term of this patent is extended or adjusted under 35 U.S.C. 154(b) by 227 days.

(21) Appl. No.: 13/494,470

(22) Filed: Jun. 12, 2012

(65) Prior Publication Data

US 2013/0014506 A1    Jan. 17, 2013

(30) Foreign Application Priority Data

Jul. 15, 2011  (GB) .................................. 1112181.1

(51) Int. Cl.
  *F03G 7/00* (2006.01)
  *F03G 7/04* (2006.01)
  *F24J 3/08* (2006.01)
(52) U.S. Cl.
  CPC .... *F03G 7/04* (2013.01); *F24J 3/08* (2013.01); *Y02E 10/10* (2013.01)
  USPC ....................................................... 60/641.2
(58) Field of Classification Search
  CPC ..................................... F03G 7/04; F03G 7/05
  USPC ............................................. 60/641.2–641.5
  See application file for complete search history.

(56) References Cited

U.S. PATENT DOCUMENTS

| 4,369,373 A * | 1/1983 | Wiseman ..................... 290/2 |
| 5,117,908 A | 6/1992 | Hofmann |
| 2012/0199354 A1* | 8/2012 | Kaminsky .................. 166/305.1 |

FOREIGN PATENT DOCUMENTS

| CA | 2 400 577 A1 | 2/2003 |
| WO | WO 03/081038 A1 | 10/2003 |
| WO | WO 2010/104599 A2 | 9/2010 |

OTHER PUBLICATIONS

Kaminsky, System and Method for Producing Geothermal Energy. Apr. 4, 2011. PCT/US2010/046992.*
Oct. 6, 2011 British Search Report issued in British Patent Application No. GB1112181.1.

* cited by examiner

*Primary Examiner* — Hoang Nguyen
(74) *Attorney, Agent, or Firm* — Oliff PLC (57) ABSTRACT

A distribution pipeline power plant, comprising:
  an input, configured to receive a fluid that has been heated using energy derived from a geothermal field;
  an expander, configured to extract energy from the fluid that has been heated using energy derived from a geothermal field; and
  an output configured to transfer at least some of the energy extracted from the fluid that has been heated using energy derived from a geothermal field to a circulator to drive a further fluid along a distribution pipeline.

14 Claims, 7 Drawing Sheets

DISTRIBUTION PIPELINE POWER PLANT

FIELD OF THE INVENTION

Embodiments of the present invention relate to a distribution pipeline power plant.

BACKGROUND TO THE INVENTION

Fluids, such as natural gas are widely transmitted along, long distribution pipelines. To overcome pressure drops in the pipelines booster stations are required, often in remote locations.

It would therefore be advantageous to provide an improved distribution pipeline power plant that may power booster stations reliably, even in remote locations.

BRIEF DESCRIPTION OF VARIOUS EMBODIMENTS OF THE INVENTION

Some embodiments of the invention provide for a geothermally powered distribution pipeline power plant.

According to various, but not necessarily all, embodiments of the invention there is provided a distribution pipeline power plant, comprising:
  an input, configured to receive a fluid that has been heated using energy derived from a geothermal field;
  an expander, configured to extract energy from the fluid that has been heated using energy derived from a geothermal field; and
  an output configured to transfer at least some of the energy extracted from the fluid that has been heated using energy derived from a geothermal field to a circulator to drive a further fluid along a distribution pipeline.

According to various, but not necessarily all, embodiments of the invention there is provided a system comprising:
  at least one circulator, configured to drive a fluid along a distribution pipeline, and
  a power plant configured to transfer a majority of energy extracted from a geothermal field to the circulator to drive the fluid along the distribution pipeline.

According to various, but not necessarily all, embodiments of the invention there is provided a method comprising:
  receiving a fluid that has been heated using energy derived from a geothermal field;
  extracting energy from the fluid that has been heated using energy derived from a geothermal field; and
  transferring at least some of the energy extracted from the fluid that has been heated using energy derived from a geothermal field to drive a further fluid along a distribution pipeline.

According to various, but not necessarily all, embodiments of the invention there is provided a distribution pipeline power plant, comprising:
  input means for receiving a fluid that has been heated using energy derived from a geothermal field;
  means for extracting energy from the fluid that has been heated using energy derived from a geothermal field; and
  output means for transferring at least some of the energy extracted from the fluid that has been heated using energy derived from a geothermal field to means for driving a further fluid along a distribution pipeline.

According to various, but not necessarily all, embodiments of the invention there is provided a system comprising:
  means for driving a fluid along a distribution pipeline, and
  means for transferring a majority of energy extracted from a geothermal field to the means for driving a fluid to drive the fluid along the distribution pipeline.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The figures illustrate a distribution pipeline power plant 2, comprising an input 4, configured to receive a fluid 6 that has been heated using energy 8 derived from a geothermal field 10, an expander 12, configured to extract energy 8 from the fluid 6 that has been heated using energy 8 derived from the geothermal field 10 and an output 14 configured to transfer at least some of the energy 8 extracted from the fluid 6 that has been heated using energy 8 from the geothermal field 10 to a circulator 16 to drive a further fluid 18 along a distribution pipeline 20.

Figure 1A:
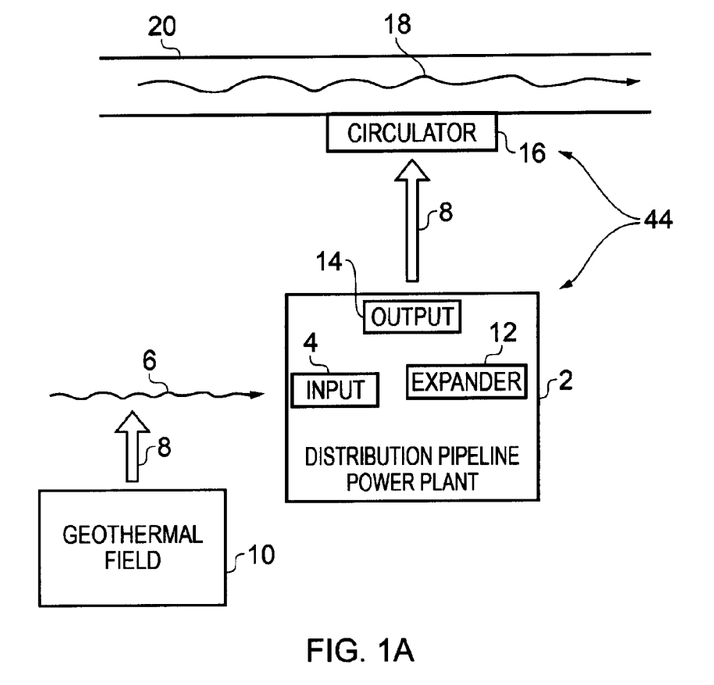
FIG. 1A illustrates a schematic example of a system comprising a power plant and a circulator.

FIG. 1A illustrates an example of a system 44 comprising a power plant 2 and a circulator 16. The system 44 may comprise further elements.

In FIG. 1A the power plant 2 is a schematic example of a distribution pipeline power plant 2. The distribution pipeline power plant 2 is configured to extract energy 8 from a fluid 6 that has been heated by a geothermal field 10 and to transfer at least some of the extracted energy 8 to a circulator 16 to drive a further fluid 18 along a distribution pipeline 20. The distribution pipeline power plant 2 may use a majority of its power to drive the further fluid 18 along the distribution pipeline 20.

For example, the distribution pipeline power plant 2 may be configured to transfer at least some of the extracted energy to the circulator 16 to drive the further fluid 18 along a distribution pipeline 20 for onward transport. As a further example, the distribution pipeline power plant 2 may be configured to transfer at least some of the extracted energy 8 to the circulator 16 to drive the further fluid 18 along the distribution pipeline 20 and into the ground for storage of the further fluid 18.

The distribution pipeline power plant 2 comprises an input 4, an expander 12 and an output 14. The distribution pipeline power plant 2 may comprise any number of further elements, for example but not limited to, further inputs 4, expanders 12 and outputs 14 not illustrated in FIG. 1A for the sake of clarity.

In the example illustrated in FIG. 1A the input 4 is configured to receive the fluid 6 that has been heated using energy 8 that has been derived from a geothermal field 10. The input 4 is also configured to allow the fluid 6 to pass to the expander 12.

In the illustrated example, the expander 12 is configured to extract energy 8 from the received fluid 6. The expander 12 is also configured to provide at least some of the extracted energy 8 to the output 14 in, for example, mechanical or electrical form.

As used in this application, the term expander means anything that is suitable for extracting energy 8 from a thermodynamic cycle. For example, the expander 12 may be a turbine or a reciprocating device.

According to embodiments, the output 14 is configured to transfer at least some of, a majority of or all of the extracted energy 8 to the circulator 16 to drive a further fluid 18 along a distribution pipeline 20.

The circulator 16 may be any device or means suitable for driving the further fluid 18 along the distribution pipeline 20. For example, the circulator 16 may be a compressor or a pump.

Figure 1B:
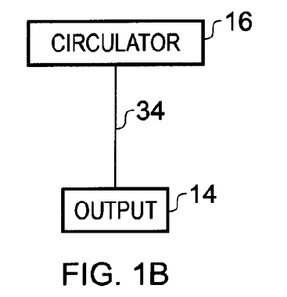
FIG. 1B illustrates a schematic example of an electrical connection.
Figure 1C:
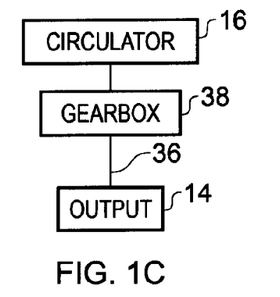
FIG. 1C illustrates a schematic example of a mechanical connection.
Figure 1D:
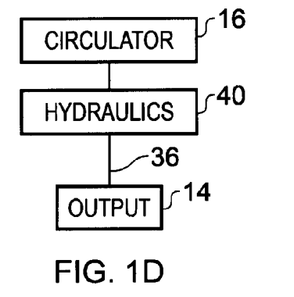
FIG. 1D illustrates a further schematic example of a mechanical connection.

The output 14 may be configured to transfer at least some of, a majority of or all of the extracted energy 8 to the circulator 16 through any suitable means. FIGS. 1B to 1D illustrate examples of means that may be used to transfer energy 8 to the circulator 16.

For example, the output 14 may be configured to transfer at least some of, a majority of or all of the energy 8 extracted from the fluid 6 to the circulator 16 through an electrical connection 34 as illustrated in FIG. 1B.

As a further example, the output 14 may be configured to transfer at least some of, a majority of or all of the extracted energy 8 to the circulator 16 through a mechanical connection 36 as illustrated in FIGS. 1C and 1D. The mechanical connection 36 may for example comprise a gearbox 38 as illustrated in FIG. 1C or hydraulics 40 as illustrated in FIG. 1D. The mechanical connection 36 may comprise both a gearbox 38 and hydraulics 40 and may also comprise more than one gearbox 38 and/or hydraulics 40.

In an alternative embodiment the output 14 may be configured to transfer at least some of, a majority of or all of the extracted energy 8 to the circulator 16 through a non-mechanical connection comprising hydraulics 40.

In addition, a combination of a mechanical connection 36 and an electrical connection 34 may be used to transfer at least some of, a majority of or all of the extracted energy 8 to the circulator 16.

The output 14 may be configured to transfer at least some of, a majority of or all of the extracted energy 8 directly to the circulator 16. For example, the output 14 may be configured to transfer at least some of, a majority of or all of the extracted energy 8 through a direct electrical connection 34 as opposed to an extended network of electrical connections between the output 14 and the circulator 16.

Similarly, the output 14 may be configured to transfer at least some of, a majority of or all of the extracted energy 8 to the circulator 16 through a direct mechanical connection 36.

Furthermore, the connection between the output 14 and the circulator 16 may be such as to allow for variable speed operation of the circulator 16 which would allow for variable flow of the further fluid 18 along the distribution pipeline 20. For example, one or more gearboxes 38 may be used to allow for the variable speed operation of the circulator 16.

The distribution pipeline power plant 2 may be located primarily for the purpose of transferring energy 8 extracted from the fluid 6 that has been heated using energy 8 derived from a geothermal field 10 to the circulator 16 to drive the further fluid 18 along the distribution pipeline 20. In this embodiment the distribution pipeline power plant 2 may transfer a majority of the extracted energy 8 to drive the further fluid 18 along the distribution pipeline 20.

The distribution pipeline power plant 2 may be dedicated to extracting the energy 8 from the fluid 6 and transferring at least some of, a majority of or all of the extracted energy 8 to the circulator 16 to drive the further fluid 18 along the distribution pipeline 20. That is, in embodiments the distribution pipeline power plant 2 may only transfer the extracted energy 8 to the circulator 16.

In other embodiments the distribution pipeline power plant 2 and system 44 may be configured to transfer a portion of the extracted energy 8 for further uses in addition to the driving of the further fluid 18 along the distribution pipeline 20 by the circulator 16.

For example, the distribution pipeline power plant 2 may be configured to transfer some of the extracted energy 8 to one or more additional pumps/compressors.

Furthermore, the distribution pipeline power plant 2 may be configured to drive one or more generators to provide electricity that may, for example, be used in the local area of the distribution pipeline power plant 2 or transferred into an extended network.

Alternatively or additionally the distribution pipeline power plant 2 and system 44 may be configured to utilize waste heat, derived from the geothermal field 10, in space heating, for example.

As used in this application a geothermal field is a subterranean volume, at an elevated temperature, through which it is possible to pass a fluid. The fluid may pass through the geothermal field via cracks, fissures and/or other conduits. The cracks, fissures and/or other conduits may be naturally occurring or may be manmade.

According to embodiments the energy 8 may be derived from a suitable geothermal field 10 that is already present and is local to the location or required location of the circulator 16 in the distribution pipeline 20.

In some embodiments it may be necessary to create a suitable geothermal field 10 in the vicinity of the location or required location of the circulator 16 in the distribution pipeline 20. A suitable geothermal field 10 may, for example, be created in the required location by forcing liquids through rocks to create new fracture fields in the required location.

Therefore, in embodiments the geothermal field 10 may have been created primarily for the purpose of extracting energy 8 to drive the further fluid 18 along the distribution pipeline 20.

In some embodiments, the fluid 6 may be a geothermal fluid 50 that is passed through the geothermal field 10 such that it is heated directly by the geothermal field 10. See for example FIG. 2.

In other embodiments, energy may be transferred indirectly to the fluid 6 from the geothermal fluid 50 via a heat exchanger 30 such that the fluid 6 is not passed through the geothermal field 10. See for example FIG. 3.

According to some embodiments, the distribution pipeline 20 may be integrated into the system 44 such that the further fluid 18 is used in the extraction of energy 8 from the geothermal field 10.

For example, the further fluid 18 may be the fluid 6 from which the energy 8 is extracted such that the fluid 6 and the further fluid 18 are substantially the same. See for example FIG. 4.

Additionally or alternatively, the further fluid 18 may, in some embodiments, be used as the geothermal fluid 50 that is passed through the geothermal field 10. See for example FIGS. 4 and 5.

The further fluid 18 may be any fluid. For example, the distribution pipeline 20 may be part of a system used in carbon capture and storage such that the further fluid 18 is carbon dioxide. The distribution pipeline 20 may be for transporting the carbon dioxide to a storage location.

Alternatively, as an additional example, the further fluid 18 may be water. In the case where the further fluid 18 is water, the distribution pipeline power plant 2 and system 44 could be used for standard pumping, irrigation or flood pumping applications or be part of a desalination or water treatment scheme.

Other non-limiting examples of what the further fluid 18 may be are oil and natural gas.

FIGS. 2 to 6 illustrate various embodiments of the power plant 2 and system 44 illustrated in FIGS. 1A to 1D.

Each embodiment illustrated in FIGS. 2 to 6 comprises a geothermal cycle 48 and a power cycle 52.

A geothermal cycle 48 comprises the movement of a geothermal fluid 50 through a geothermal field 10 such that energy 8 is transferred from the geothermal field 10 to the geothermal fluid 50. The geothermal fluid 50 exits the geothermal field 10 and the energy 8 may then be extracted from the geothermal fluid 50.

For example, the geothermal fluid 50 may enter the geothermal field 10 in a liquid state and exit the geothermal field in a gaseous state.

A power cycle 52 comprises extraction of energy 8 from a fluid such that work can be done. For example, in embodiments the power cycle 52 comprises extracting energy 8 from the fluid 6 using expander 12 to drive the further fluid 18 along the distribution pipeline 20.

Figure 2:
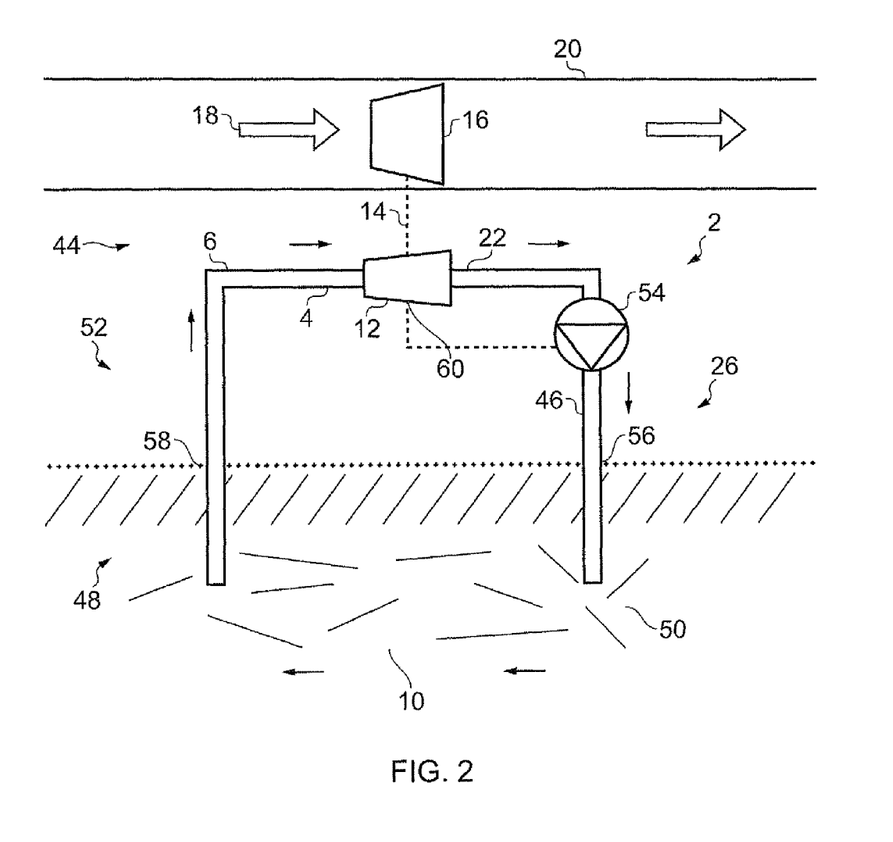
FIG. 2 illustrates a first embodiment of the system and power plant.
Figure 4:
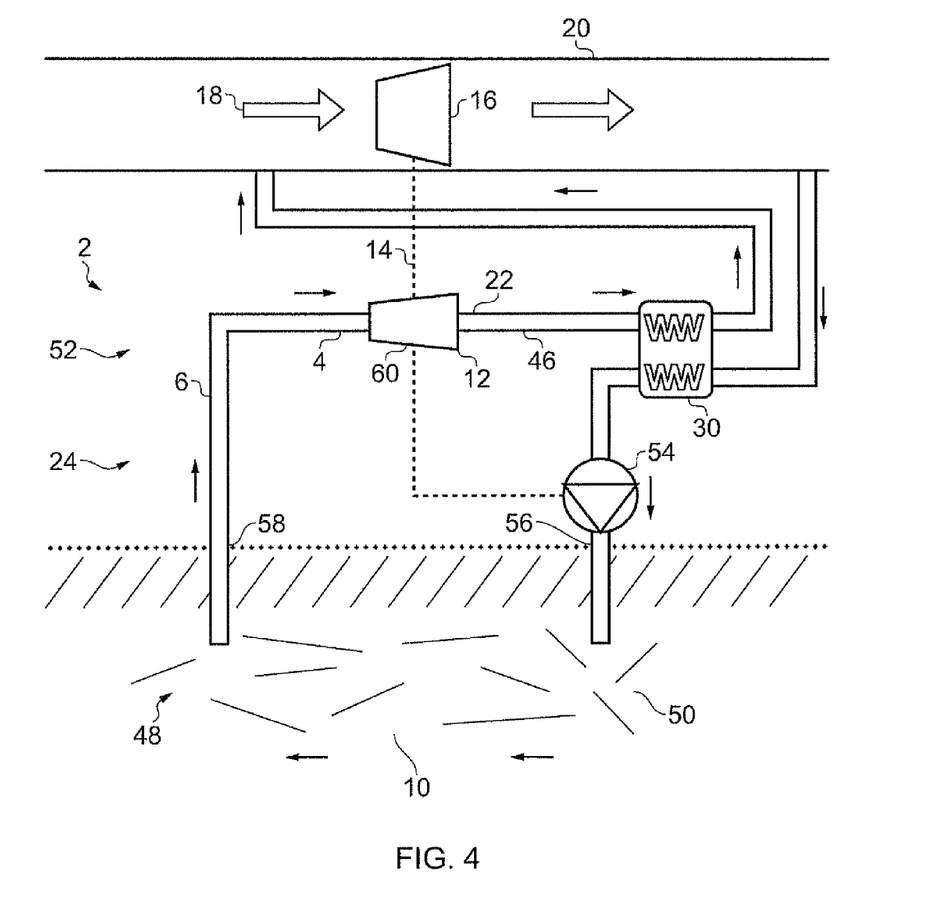
FIG. 4 illustrates a third embodiment of the system and power plant.

The geothermal cycle 48 and power cycle 52 may be combined as illustrated, for example, in FIGS. 2 and 4.

Figure 5:
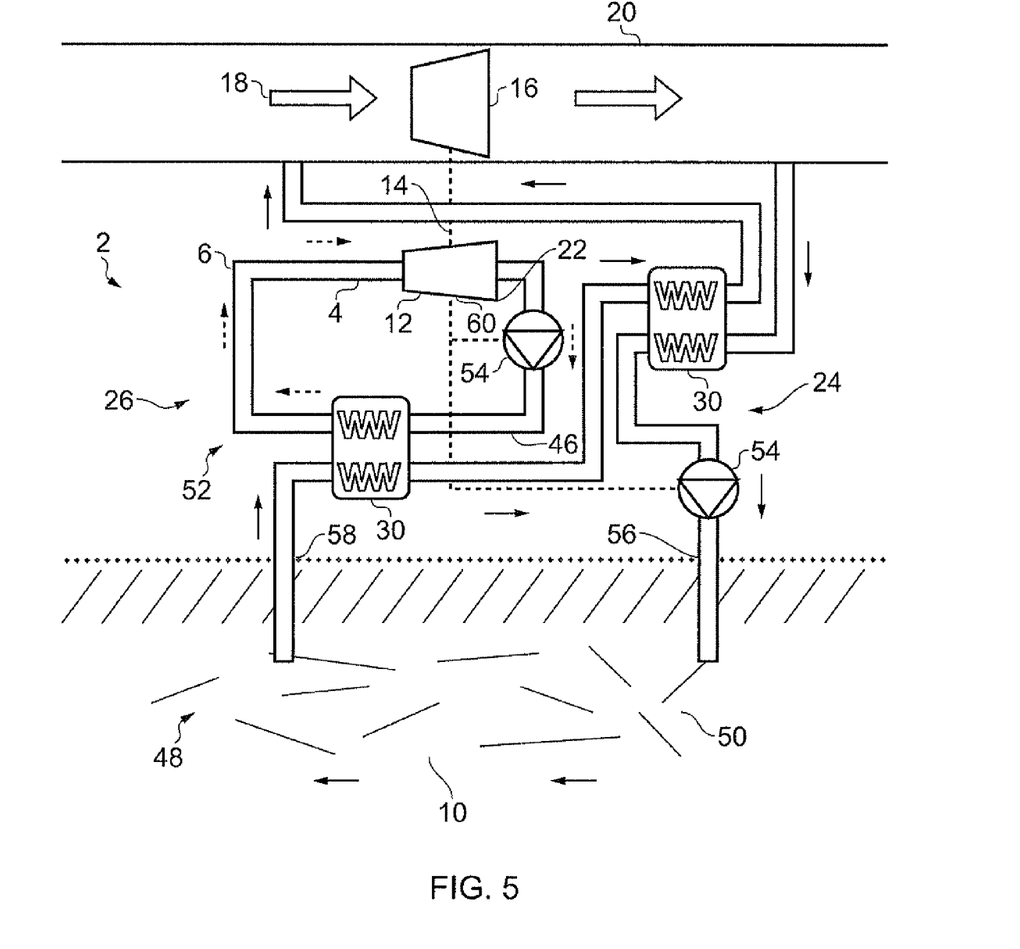
FIG. 5 illustrates a fourth embodiment of the system and power plant.

The geothermal cycle 48 may be open as illustrated in FIGS. 4 and 5. In FIGS. 4 and 5 the geothermal cycle 48 is open because the geothermal fluid 50 is taken from and returned to the distribution pipeline 20. This means that the geothermal fluid 50 that is returned to the distribution pipeline 20 may not necessarily re-enter the geothermal field 10 as part of the geothermal cycle 48.

In FIGS. 4 and 5 the geothermal fluid 50 therefore flows around an open circuit 24.

Figure 3:
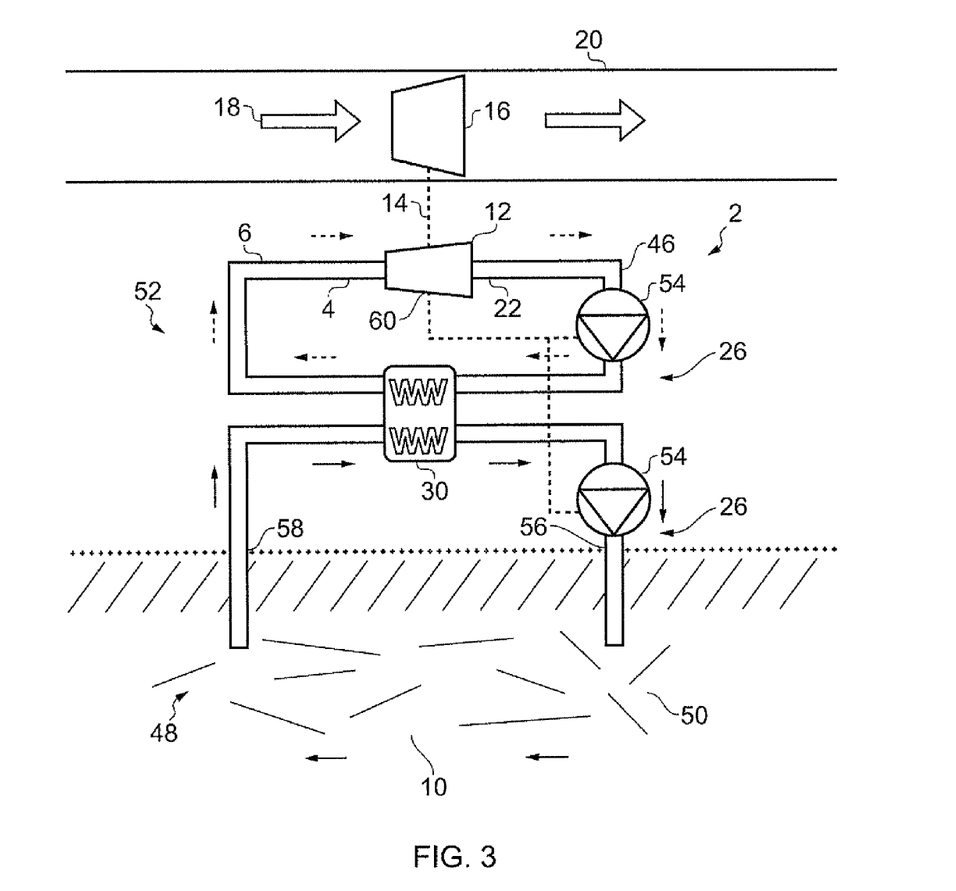
FIG. 3 illustrates a second embodiment of the system and power plant.
Figure 6:
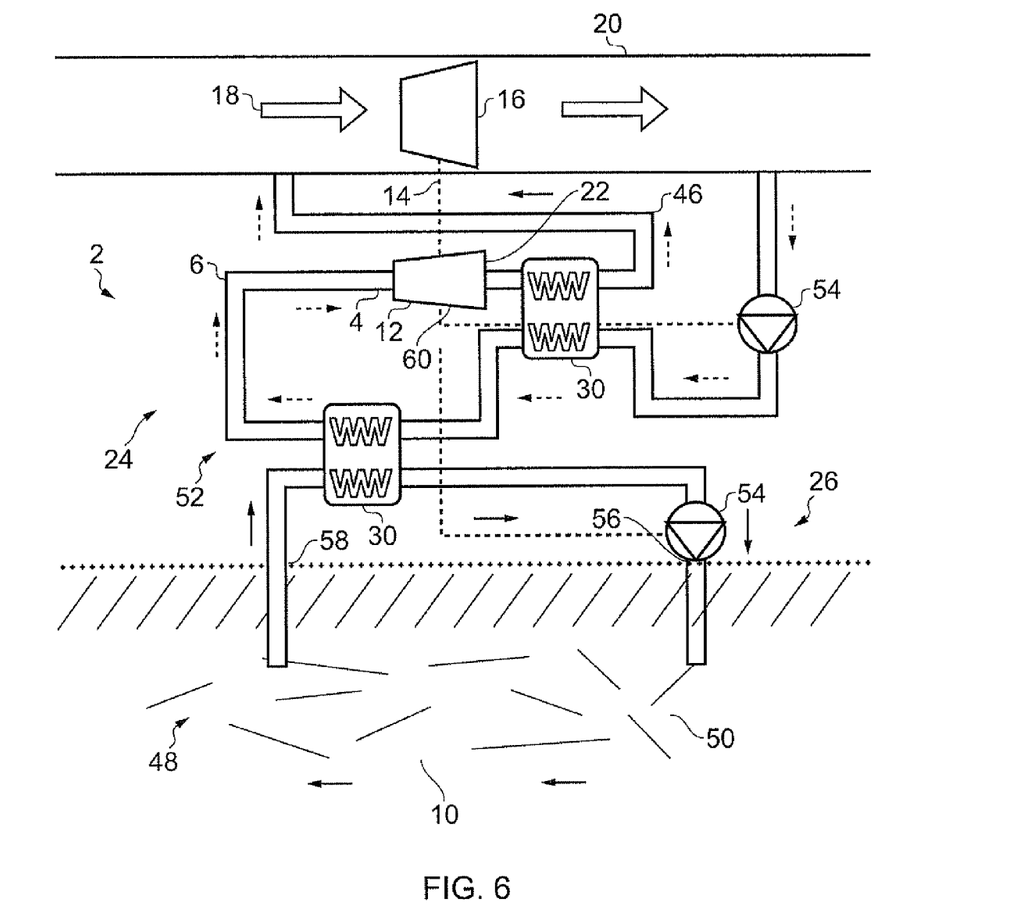
FIG. 6 illustrates a fifth embodiment of the system and power plant.

Alternatively, the geothermal cycle 48 may be closed as illustrated in FIGS. 2, 3 and 6. In FIGS. 2, 3 and 6 the geothermal cycle 48 is closed because it is separated from the distribution pipeline 20 such that the geothermal fluid 50 exits the geothermal field 10 and is returned to the geothermal field 10 in a closed loop.

In FIGS. 2, 3 and 6 the geothermal fluid 50 therefore flows around a closed circuit 26.

The power cycle 52 may also be open, as illustrated in FIGS. 4 and 6, or closed as illustrated in FIGS. 2, 3 and 5.

It is noted that the geothermal field 10 may be leaky. That is, the geothermal fluid 50 may escape from the geothermal field over time, for example through adsorption/diversion into other fracture systems. In embodiments where the geothermal field 10 is leaky it may be necessary to accommodate the provision of make-up fluids into the geothermal field 10.

Additionally/alternatively a potential solution to a leaky geothermal field 10 is to integrate the distribution pipeline 20 into the geothermal cycle 48 such that the further fluid 18 is used as the geothermal fluid 50. Such embodiments will be described in greater detail below.

However, a cycle/circuit comprising a leaky geothermal field 10 but not comprising the distribution pipeline 20 will be referred to as closed.

The above mentioned embodiments will be described in greater detail below with reference to FIGS. 2 to 7.

FIG. 2 illustrates a first embodiment of the power plant 2 and system 44 illustrated in FIGS. 1A to 1D.

In this embodiment the geothermal cycle 48 and power cycle 52 are combined. In FIG. 2 the geothermal/power cycle is closed and the distribution pipeline power plant 2 further comprises an outlet 22 configured to allow the fluid 6 to pass out of the distribution pipeline power plant 2 for return of the fluid 6 to the input 4 as part of a closed circuit 26.

As illustrated in FIG. 2, the power plant 2 may further comprise a further output 60 configured to transfer at least some of the extracted energy 8 to a fluid pump 54 for pumping the geothermal fluid 50, which in this embodiment is also the fluid 6, around the geothermal cycle 48.

The further output 60 may be configured to transfer at least some of the extracted energy 8 to the fluid pump 54 through a mechanical connection 36, an electrical connection 34 or a combination of the two as discussed above in relation to FIGS. 1B to 1D. The output 14 and the further output 60 may be the same or different outputs.

Additionally or alternatively, the fluid pump 54 may be powered from a different source. In FIG. 2 the fluid pump 54 is located in flow series after the outlet 22 of the distribution pipeline power plant 2. However, the fluid pump 54 may be located at a different point in the system 44 and/or further fluid pumps may also be included in the system 44. Any additional fluid pumps may be driven by the distribution pipeline power plant 2 and/or a different source.

The location/number of fluid pumps is a matter of design choice which may be influenced by the properties of the site of the distribution pipeline power plant 2.

As illustrated in FIG. 2, the system 44 may further comprise at least one pipe 46 configured to form part of the geothermal cycle 48. The geothermal fluid 50 is passed into the geothermal field through an injection well 56, which may comprise the pipe 46, casing and instrumentation.

The geothermal fluid 50 passes through the geothermal field 10 where it is heated by the geothermal field 10. The heated geothermal fluid 50 exits the geothermal field 10 through a production well 58, which may comprise the pipe 46, casing and instrumentation.

In FIG. 2 the geothermal fluid 50 passes through the distribution pipeline power plant 2, after exiting the geothermal field 10, which extracts energy from the geothermal fluid 50 and transfers at least some of, a majority of or all of the extracted energy 8 to the circulator 16 to drive the further fluid 18 along the distribution pipeline 20.

The geothermal fluid 50 may be used directly by the distribution pipeline power plant 2 as illustrated in FIG. 2. This may be appropriate in sites where it may be shown that the geothermal fluid 50, and any element/impurity that may be picked up in the geothermal field 10 is not harmful to the distribution pipeline power plant 2 or its performance.

The direct use of the geothermal fluid 50 may be particularly suited to sites where the geothermal field 10 is of a very high temperature such that there is less need to use recuperated cycles. This is because in such sites there is more energy available to use.

In general, the geothermal fluid 50 may originate from a proximate aquifer that is intercepted by the geothermal field

10. The geothermal fluid 50 may also be imported to the site of the distribution pipeline power plant 2. However, importing such a large volume of fluid to the site of the distribution pipeline power plant 2 may be difficult.

Furthermore, the geothermal fluid 50 may have originated from the distribution pipeline 20. The geothermal system may be closed off from the distribution pipeline 20 once a sufficient quantity of fluid has been drawn off into the geothermal system. This would allow the distribution pipeline power plant 2 to be set up without requiring a large volume of fluid to be transported to the site of the distribution pipeline power plant 2.

The geothermal fluid 50 may originate from any combination of the above mentioned sources.

FIG. 3 illustrates a second embodiment of the power plant 2 and system 44 illustrated in FIGS. 1A to 1D.

In the embodiment of FIG. 3 the geothermal cycle 48 and the power cycle 52 are separate and both the geothermal cycle 48 and the power cycle 52 are closed.

In FIG. 3, fluid pumps 54 are illustrated in both the power and geothermal cycles. In FIG. 3 the fluid pump 54 in the power cycle 52 is located in flow series after the outlet 22 of the distribution pipeline power plant 2. The fluid pump 54 in the geothermal cycle 48 is located in flow series prior to the fluid entering the geothermal field 10.

Again the location of the fluid pumps 54 may be altered and/or additional fluid pumps 54 included. The fluid pumps may be driven as described with reference to FIG. 2.

The fluid 6 and geothermal fluid 50 in FIG. 3 may have originated as described with reference to the fluid 6/geothermal fluid 50 in FIG. 2.

In the embodiment of FIG. 3, heat is transferred from the geothermal fluid 50 to the fluid 6 through a heat exchanger 30. The energy 8 is then extracted from the fluid 6 by the distribution pipeline power plant 2 and at least some of, a majority of or all of the extracted energy 8 transferred to the circulator 16.

The use of a heat exchanger 30 may be advantageous if the distribution pipeline power plant 2 may be sensitive to, for example damaged by, the geothermal fluid properties, for example, impurities in the geothermal fluid 50 and/or impurities imparted to the geothermal fluid when passing through the geothermal field 10.

Furthermore, the use of a heat exchanger 30 may allow for the use of a lower temperature geothermal field 10, for example a geothermal field 10 at a shallower depth.

In the embodiment of FIG. 3 the fluid 6 may be different to the geothermal fluid 50 and may have different properties, for example improved heat transfer characteristics, lower boiling point and/or different operating phase (sub/super critical).

Alternatively, the fluid 6 and the geothermal fluid 50 may be the same and each may originate from the sources discussed with reference to the fluid 6/geothermal fluid 50 of FIG. 2.

In addition, in the embodiment of FIG. 3, the power cycle 52 and the geothermal cycle 48 may operate with different characteristics, for example different flow rates and or pressures. This may be achieved, for example, using one or more gear boxes in the connection to the fluid pumps 54. The use of different operating characteristics in the geothermal and power cycles would allow for optimization of the system 44.

FIG. 4 illustrates a third embodiment of the power plant 2 and system 44 illustrated in FIGS. 1A to 1D.

In this embodiment the geothermal cycle 48 and power cycle 52 are combined as in the embodiment of FIG. 2. In the embodiment of FIG. 4 the geothermal/power cycle is open and the distribution pipeline power plant 2 further comprises an outlet 22 configured to allow the fluid 6 to pass out of the distribution pipeline power plant 2 for return of the fluid 6 to the distribution pipeline 20 as part of an open circuit 24.

The embodiment illustrated in FIG. 4 operates similarly to the embodiment illustrated in FIG. 2 with the distribution pipeline 20 integrated into the geothermal cycle 48.

In the embodiment of FIG. 4 the geothermal fluid 50, which is the same as the fluid 6, is used directly by the distribution pipeline power plant 2 as described above with reference to FIG. 1. However, in the embodiment of FIG. 4 the distribution pipeline 20 is integrated into the geothermal cycle 50 and the further fluid 18 is used as the geothermal fluid 50/fluid 6.

In FIG. 4 the geothermal fluid 50 is returned to the distribution pipeline 20 upstream of the circulator 16 and taken from the distribution pipeline 20 downstream of the circulator 16. However, in other embodiments the geothermal fluid 50 may be both returned to and taken from upstream of the circulator 16 or downstream of the circulator 16.

In the embodiment of FIG. 4, a fluid pump 54 is illustrated in the geothermal cycle 48. The fluid pump 54 is located in flow series before the geothermal fluid 50 enters the geothermal field 10.

Again the location of the fluid pump 54 may be altered and/or additional fluid pumps 54 included. The fluid pumps may be driven as described with reference to FIG. 2.

In addition, the fluid pump 54 may be omitted and the compression/pumping of the circulator 16 used to drive the flow of the fluid through the geothermal field 10.

The use of the further fluid 18 from the distribution pipeline 20 as the geothermal fluid 50 in the embodiment of FIG. 4 allows the distribution pipeline power plant 2 to be set up without needing to import large volumes of fluid to the site of the power plant 2 that would typically be required in a geothermal scheme.

In addition, the use of the further fluid 18 as the geothermal fluid 50 may also provide the advantage of capitalizing on any beneficial characteristics of the further fluid 18 from heat transfer and/or turbo machinery perspective.

The use of the further fluid 18 as the geothermal fluid 50 may be appropriate where slight leakage of the further fluid 18 through the geothermal field 10 is not detrimental economically and/or environmentally.

It may also be appropriate where there is a high degree of confidence that the geothermal field 10 is not leaky and where there is not a significant risk that in passing through the geothermal field 10 the geothermal fluid 50 may pick up impurities that could negatively affect the circulator 16 and/or downstream processes in the distribution pipeline 20.

In the embodiment of FIG. 4 a heat exchanger 30 may be included as illustrated. In the example illustrated in FIG. 4 the geothermal fluid 50 is cooled after leaving the output 22 of the power plant 2 by transferring heat to the geothermal fluid 50 that is about to enter the geothermal field 10 via the heat exchanger 30. The geothermal fluid 50 is therefore pre-heated before being passed through the geothermal field 10.

It may be beneficial to control the temperature of the fluid re-entering the distribution pipeline and/or entering the geothermal field 10. An example of this is in carbon capture and storage schemes where the further fluid 18 is carbon dioxide. Heating the carbon dioxide prior to it entering the geothermal field 10 may reduce the harmful cooling effects of the expansion of carbon dioxide into the injection well 56, for example material embrittlement and the formation of hazardous solid carbon dioxide at high velocity.

The amount by which the temperature of the further fluid 18 should be raised or lowered depends on the further fluid in use and also the distribution network configuration.

FIG. 5 illustrates a fourth embodiment of the power plant 2 and system 44 illustrated in FIGS. 1A to 1D.

In the embodiment illustrated in FIG. 5 the geothermal cycle 48 is open and the further fluid 18 is used as the geothermal fluid 50. The power cycle 52 is separate from the geothermal cycle 48 and is closed.

In FIG. 5, fluid pumps 54 are illustrated in both the power and geothermal cycles. The fluid pump 54 in the power cycle 52 is located in flow series after the outlet 22 of the distribution pipeline power plant 2. The fluid pump 54 in the geothermal cycle 48 is located in flow series prior to the geothermal fluid 50 entering the geothermal field 10.

Again the location of the fluid pumps 54 may be altered and/or additional fluid pumps 54 included. The fluid pumps may be driven as described with reference to FIG. 2.

The embodiment illustrated in FIG. 5 is effectively a combination of the embodiments illustrated in FIGS. 3 and 4 as the distribution pipeline 20 is integrated into the geothermal cycle 48 and a heat exchanger 30 is used to transfer energy 8 from the geothermal fluid 50 to the fluid 6.

The embodiment illustrated in FIG. 5 therefore comprises the advantages of using the further fluid 18 as the geothermal fluid 50, described above with reference to FIG. 4, and the advantages of using a separate power cycle 52 as described above with reference to FIG. 3.

The embodiment illustrated in FIG. 5 also comprises a heat exchanger 30 that cools the geothermal fluid 50 prior to return to the distribution pipeline 20/pre-heats the geothermal fluid 50 prior to entry into the geothermal field 10 as described with reference to FIG. 4.

The fluid 6 may originate from the sources described above with reference to FIG. 2. It may be necessary to import the fluid 6 for the power cycle 52 to the site of the distribution pipeline power plant 2. However, this represents a significant volumetric reduction in the amount of fluid that must be imported to the site compared to systems where sufficient fluid must be imported to fill the entire geothermal field 10.

FIG. 6 illustrates a fifth embodiment of the power plant 2 and system 44 illustrated in FIGS. 1A to 1D.

In the embodiment illustrated in FIG. 6 the geothermal cycle 48 is closed. The power cycle 52 is separate from the geothermal cycle 48 and is open. The further fluid 18 is used in the power cycle 52 as the fluid 6.

The embodiment illustrated in FIG. 6 therefore comprises the advantages of using a separate power cycle 52 as described above with reference to FIG. 3.

In FIG. 6, fluid pumps 54 are illustrated in both the power and geothermal cycles. The fluid pump 54 in the power cycle 52 is located in flow series after the fluid 6/further fluid 18 exits the distribution pipeline 20. The fluid pump 54 in the geothermal cycle 48 is located in flow series prior to the geothermal fluid entering the geothermal field 10.

Again the location of the fluid pumps 54 may be altered and/or additional fluid pumps 54 included. The fluid pumps may be driven as described with reference to FIG. 2.

In the embodiment illustrated in FIG. 6 the circulator 16 may provide all of the compression for the power cycle 52.

In the embodiment of FIG. 6, the system comprises a heat exchanger 30 for transferring heat from the geothermal fluid 50 to the fluid 6. The embodiment of FIG. 6 also comprises a heat exchanger 30 for cooling the fluid 6 prior to return to the distribution pipeline 20/pre-heating the fluid 6 prior to entering the input 6.

It should be noted that in the context of all embodiments described above, in embodiments where supercritical carbon dioxide or any other supercritical fluid is used in the power cycle 52, the use of specially adapted turbomachinery in the distribution pipeline power plant 2 may provide optimal results.

It should also be noted that additional compressors/pumps could be incorporated into the cycles of the above described embodiments as a function of working pressures, flow rates, geothermal site characteristics and so on.

Figure 7:
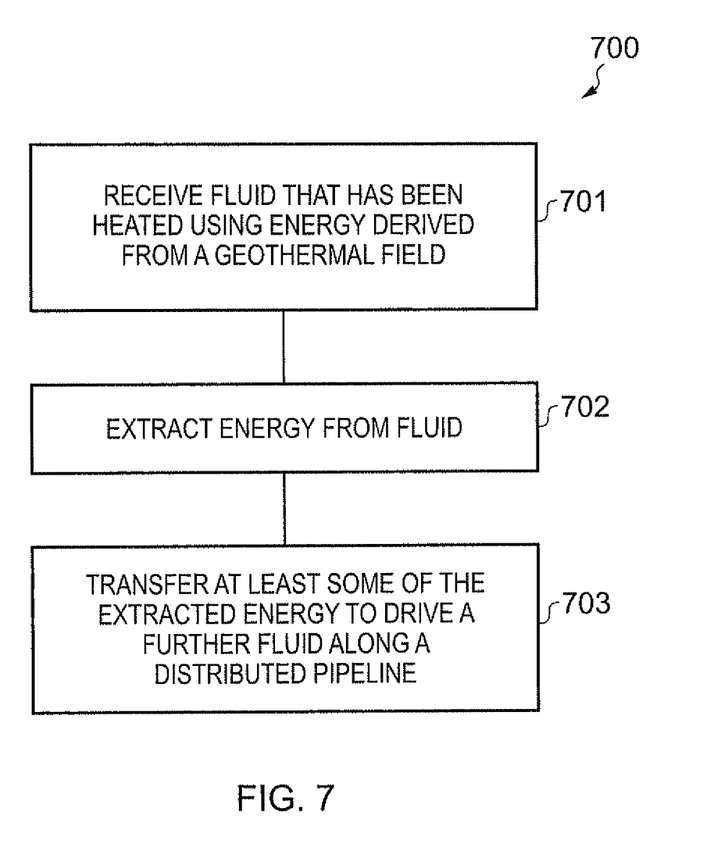
FIG. 7 illustrates a method.

FIG. 7 illustrates a method 700. The method 700 may be carried out by the power plant 2 described above in particular with reference to FIGS. 1 to 6.

At block 701 a fluid is received that has been heated using energy derived from a geothermal field. The fluid may have passed through the geothermal field or alternatively energy may have been transferred to the fluid from a fluid that has been passed through the geothermal field.

At block 702 energy is extracted from the received fluid.

At block 703 at least some of the extracted energy is transferred to drive a further fluid along a distribution pipeline. The further fluid and the received fluid may be substantially the same.

Embodiments of the present invention therefore avoid the need for fuel to drive the further fluid 18 along the distribution pipeline 20 and provide a reliable energy source meaning backup requirements for the power plant 2 are minimized.

Furthermore, utilization of the geothermal energy allows the driving of the further fluid 18 to be completely renewably powered but does not compromise security of energy supply.

Embodiments of the invention also allow for the distribution pipeline 20 route/configuration to not be limited by existing electrical/fuelling infrastructure constraints which may allow a more economic routing of the distribution pipeline 20.

In addition, in embodiments where the geothermal fluid is carbon dioxide an operator may generate carbon dioxide credits with regard to the carbon dioxide which is effectively sequestered in the geothermal cycle.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The invention claimed is:

1. A distribution pipeline power plant configured to deliver a further fluid to an offsite location, the distribution pipeline power plant, comprising:
an input, configured to receive a fluid that has been heated using energy derived from a geothermal cycle fluid from a geothermal field;
an expander, configured to extract energy from the fluid that has been heated using energy derived from a geothermal field; and
an output configured to return the geothermal cycle fluid to the geothermal field, and to transfer at least some of the energy extracted from the fluid that has been heated using energy derived from a geothermal field to a circulator to drive a further fluid along a distribution pipeline, wherein the geothermal cycle fluid comprises the further fluid from the distribution pipeline.

2. A distribution pipeline power plant as claimed in claim 1, further comprising an outlet configured to allow the fluid to pass out of the distribution pipeline power plant for return of the fluid to the distribution pipeline as part of an open circuit.

3. A distribution pipeline power plant as claimed in claim 1, further comprising an outlet configured to allow the fluid to pass out of the distribution pipeline power plant for return of the fluid to the input of the distribution pipeline power plant as part of a closed circuit.

4. A distribution pipeline power plant as claimed in claim 2, wherein the energy is derived from an open geothermal cycle.

5. A distribution pipeline power plant as claimed in claim 4, wherein the fluid is passed through the geothermal field.

6. A distribution pipeline power plant as claimed in claim 2, wherein the energy is derived from a closed geothermal cycle.

7. A distribution pipeline power plant as claimed in claim 6, wherein the energy is passed to the fluid from a geothermal fluid that is passed through the geothermal field.

8. A distribution pipeline power plant as claimed in claim 3, wherein the energy is derived from an open geothermal cycle.

9. A distribution pipeline power plant as claimed in claim 8, wherein the energy is passed to the fluid from a geothermal fluid that is passed through the geothermal field.

10. A distribution pipeline power plant as claimed in claim 3, wherein the energy is derived from a closed geothermal cycle, and the energy is passed to the fluid from a geothermal fluid that is passed through the geothermal field.

11. A distribution pipeline power plant as claimed in claim 3, wherein the energy is derived from a closed geothermal cycle and the fluid is passed through the geothermal field.

12. A distribution pipeline power plant as claimed in claim 1, wherein the distribution pipeline power plant has been located primarily for the purpose of transferring energy extracted from the fluid that has been heated using energy derived from a geothermal field to the circulator to drive the further fluid along a distribution pipeline.

13. A distribution pipeline power plant as claimed in claim 1, wherein the output is configured to transfer at least some of the energy extracted from the fluid to the circulator through an electrical connection.

14. A distribution pipeline power plant as claimed in claim 1, wherein the output is configured to transfer at least some of the energy extracted from the fluid to the circulator through a mechanical connection.

* * * * *